United States Patent [19]
Schuman

[11] 4,026,061
[45] May 31, 1977

[54] RISING WINGED SINKER

[76] Inventor: Samuel E. Schuman, 831 El Cerrito Way No. 2, Gilroy, Calif. 95020

[22] Filed: Mar. 24, 1976

[21] Appl. No.: 669,717

[52] U.S. Cl. .............................. 43/43.13; 43/44.97
[51] Int. Cl.² ........................................ A01K 95/00
[58] Field of Search ............ 43/43.13, 44.96, 44.97

[56] References Cited
UNITED STATES PATENTS

| 2,566,029 | 8/1951 | Louthan | 43/43.13 |
| 3,568,355 | 3/1971 | Hassell | 43/43.13 |

FOREIGN PATENTS OR APPLICATIONS 221,544   1/1959   Australia .......................... 43/43.13

Primary Examiner—Russell R. Kinsey
Assistant Examiner—Daniel J. Leach

[57] ABSTRACT

A novel type of sinker, that is designed so as to rise upwardly when a fishing line is retrieved at a moderately fast pace, the sinker including an elongated metal body, which at its forward end is upwardly turned, so as to form a scoop, and, upon a rear end of the main body, there are a pair of upwardly extending, thin wings that act as rudders, the scoop having an opening therethrough for attachment to a fishing line and leader to a fishing hook.

4 Claims, 5 Drawing Figures

U.S. Patent May 31, 1977 4,026,061
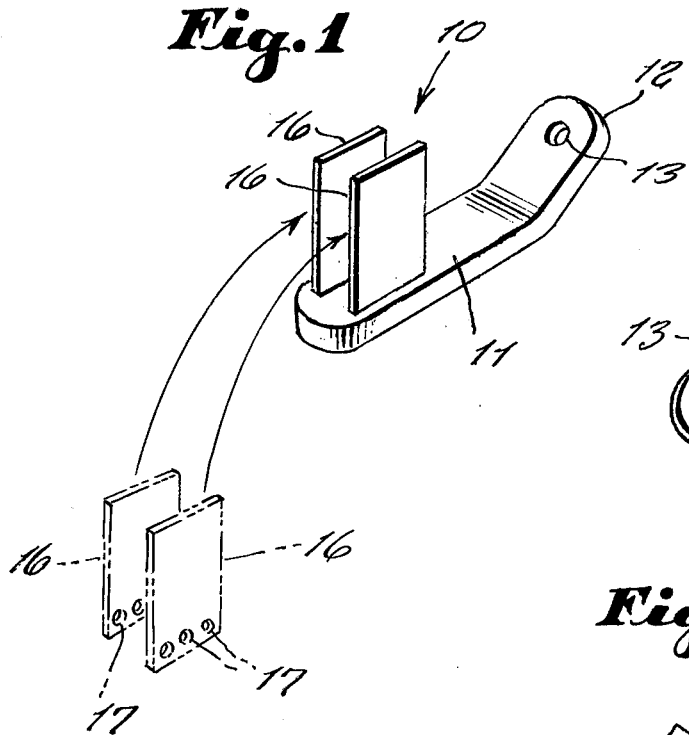
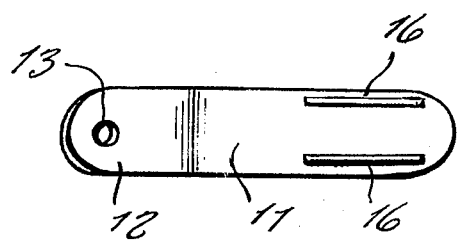
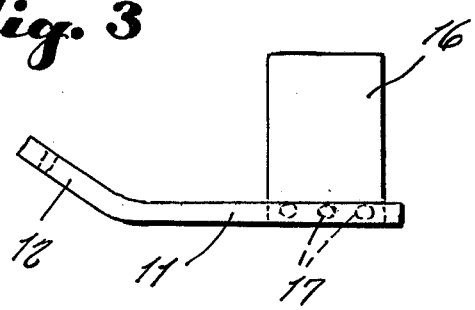
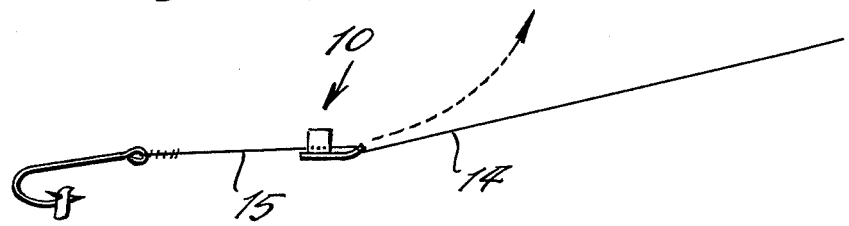
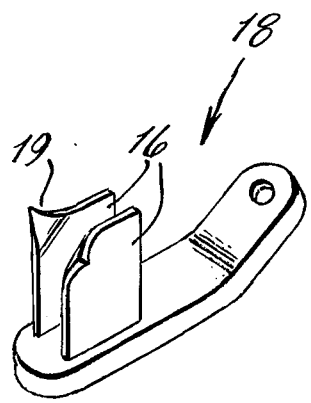

RISING WINGED SINKER

This invention relates generally to fishing tackle. More specifically, the present invention relates to fishing sinkers.

A principal object of the present invention is to provide a new type of sinker, that is designed to rise upwardly on a moderately fast retrieve action, while surf fishing or lake fishing.

Another object of the present invention is to provide a rising sinker, which is winged by having two wings, that act as rudders, to keep the sinker moving along a desired path.

Yet another object of the present invention is to provide a rising winged sinker, which has an upwardly turned forward end, to form a scoop, which causes the sinker to travel upwardly when a fishing line is being pulled in.

Still another object is to provide a rising winged sinker which does not whirl excessively, and thus cause the objectionable line twisting, such as occurs with other tackle.

Still a further object is to provide a rising winged sinker, which will hold desired depths more readily when used in casting and retrieving light lures.

Other objects are to provide a rising winged sinker, which is simple in design, inexpensive to manufacture, rugged in construction, easy to use and efficient in operation.

These and other objects will be readily evident upon a study of the following specification and accompanying drawing wherein:

FIG. 1 is a perspective view of the present invention;

FIG. 2 is a top view thereof;

FIG. 3 is a side view thereof;

FIG. 4 is a side view of the present invention, shown installed along a fishing line;

FIG. 5 is a perspective view of a modified design of the invention.

Reference is now made to the drawing in greater detail, and more particularly to FIGS. 1 through 4 thereof, at this time, wherein the reference numeral 10 represents a rising winged sinker, according to the present invention, and wherein there is an elongated main body 11, made of a substantial thickness, and which at its forward end is upwardly turned, so as to form scoop 12. An opening 13 is provided through a center of the scoop, in order that a fishing line 14 and leader 15 may be attached thereto. The main body 11 is made of low heat metals, such as lead, pot metal, aluminum or the like, and which are cast, being made in a size so as to have a desired weight.

Upon a rear end of the main body 11, there are a pair of upwardly extending wings 16, which are preferably made of a spring tempered brass, each wing being relatively very thin but having a great tensile strength. Each wing is of generally rectangular shape, and has a row of small openings 17 near a lower edge thereof, and which are for the purpose of anchoring the wings within the main body 11, when the main body is cast. Thus, in the casting process, the main body and the wings become a single unitary part. Both of the wings in operative use serve as rudders for the sinker.

In operative use, it is now evident that the sinker thus formed will rise on a moderately fast retrieve, when surf fishing or lake fishing, and it will not whirl excessively so as to cause the fishing line to twist. The wings being set parallel to each other and perpendicular to the main body, serve as rudders to keep the scoop 12 at the front end of the main body in a position so that the water will give the sinker an upper thrust when the sinker is being forwardly retrieved.

Reference is now made to FIG. 5 of the drawing, wherein there is a modified design of rising winged sinker 18, which is identical in construction to the above described rising winged sinker 10, except that in this design, each of the wings 16 has an outwardly bent rear upper corner 19, in order to increase drag, which being a substantial distance away from the main body 11, thus causes the sinker to make a sharp or smaller upwardly turned curve while it is being retrieved so that the rising action is accomplished quicker.

Thus, a modified design of the invention is provided.

While various changes may be made in the detail construction, it is understood that such changes will be within the spirit and scope of the present invention as is defined in the appended claims.

What I now claim is:

1. A rising winged sinker, comprising in combination, an elongated main body, a pair of wings secured to said main body, and a forward end of said main body extending angularly, respective to a rear portion of said main body, said angularly forward portion of said main body and said wings providing a means for said sinker to rise upwardly upon a moderate fast retrieving action of a fishing line.

2. The combination as set forth in claim 1, wherein each of said wings comprises a thin, rectangular brass plate, said main body being made of low heat metal, which is cast with the lower ends of said wings embedded therewithin.

3. The combination as set forth in claim 2, wherein said forward portion of said main body is bent upwardly, and has an opening therethrough for connection to a fishing line, and a leader extending to a fish hook.

4. The combination as set forth in claim 3, wherein upper rear corners of said wings are outwardly turned.

* * * * *